US005482781A

United States Patent [19]

Wittekind et al.

[11] Patent Number: 5,482,781

[45] Date of Patent: Jan. 9, 1996

[54] PROCESS FOR RESTRENGTHENING DAMAGED PAPER AND PRODUCT PRODUCED THEREBY

[75] Inventors: Jürgen Wittekind; Karl-Heinz Scherer, both of Frankfurt, Germany

[73] Assignee: Battelle Ingenieurtechnik GmbH, Eschborn, Germany

[21] Appl. No.: 337,571

[22] Filed: Nov. 10, 1994

Related U.S. Application Data

[63] Continuation of Ser. No. 99,044, Jul. 29, 1993, abandoned.

[30] Foreign Application Priority Data

Aug. 4, 1992 [DE] Germany .......................... 42 24 780.8

[51] Int. Cl.[6] ............................ B32B 29/00; B32B 35/00

[52] U.S. Cl. ........................ 428/537.5; 427/395; 427/140

[58] Field of Search ................................ 427/255.6, 394, 427/395, 385.5, 140; 428/537.5

[56] References Cited

U.S. PATENT DOCUMENTS 5,277,842 1/1994 Wittekind et al. ................ 252/400.31

FOREIGN PATENT DOCUMENTS 0273902 12/1987 European Pat. Off. .

OTHER PUBLICATIONS

Zietscheift Für Bibliothekswesen und Bibliographie Helmut Bansa, 1988, pp. 226–236 "New Developments in the Field of Preservation" No Month.

Tappi, Morak et al., Cross–Linking of Linerboard to Reduce Stiffness Loss, Apr. 1970, vol. 53, No. 4.

*Primary Examiner*—Terry J. Owens
*Assistant Examiner*—David M. Maiorana
*Attorney, Agent, or Firm*—Quarles & Brady

[57] ABSTRACT

Process for restrengthening damaged paper, in which the aged, acid-damaged friable paper is treated with a solution containing isocyanate or with isocyanate vapour. Isocyanates having two or more isocyanate groups are preferably used.

8 Claims, No Drawings

PROCESS FOR RESTRENGTHENING DAMAGED PAPER AND PRODUCT PRODUCED THEREBY

This is a continuation of application Ser. No. 08/099,044, filed Jul. 29, 1993, now abandoned.

FIELD OF THE INVENTION

The present invention relates to a process for restrengthening damaged paper which has been damaged with regard to its stability as a result of ageing processes and particularly which has become friable due to acid damage.

BACKGROUND OF THE INVENTION

Ageing occurring during storage in printed and paper products and in particular in books leads to progressive damage to the paper substance, particularly due to traces of acids released in the paper, but also due to other processes.

Depending on the degree of this damage, the papers become friable or possibly decompose completely after a few decades.

To prevent the progress of acid damage, processes are known in which the papers are subjected to neutralization treatment as single sheets or in bound form.

Continuing damage to the papers is indeed prevented using this treatment; however, adequate strengthening of papers already damaged is not achieved without measures additional to the neutralization treatment.

To maintain particularly valuable archives, strengthening processes are known in which the paper is treated in the form of individual sheets. For books the book block must be opened for this purpose.

Processes of this type consist in alkaline treatment, in which the individual sheets are passed through an alkaline bath, in chamfering, in which a cellulose fibre layer is suspended on the paper, and in gluing-on strengthening films, for example of Japanese paper. In a particularly complex variant of this process, the sheet of paper is split and the strengthening layer is sized between the sheet halves. These processes are described in detail by H. Bansa in the article "Neue Entwicklungen auf dem Gebiet der Konservierung" [New developments in the field of preservation], Zeitschrift für Bibliothekswesen und Bibliographie, Year 35, Part 3, pages 226 to 236 (1988).

In view of the very large number of books—a couple of hundred million books are to be treated worldwide—these complex processes are disadvantageous for mass treatment.

Only processes which operate using subsequent sizing of the paper and in which it is possible to treat whole books or paper pages combined in another fashion, are suitable for this.

European application 0 273 902 indicates a process for this, in which the books are treated with an aqueous calcium hydroxide solution also containing 0.1–1% of dissolved methyl cellulose. Traces of free acid are neutralized by the calcium hydroxide, while the filmforming methyl cellulose strengthens the paper after rapid freezing and freeze drying the books.

The freeze drying used, which may be up to 34 hours, is an obstacle to rational treatment of large numbers of books.

Solutions of polymeric materials, for example methyl cellulose, may also lead to increasing the viscosity of treatment solutions, which makes it difficult for uniform and reliable penetration of entire book blocks. Also in this case care must be taken to prevent bonding of individual pages.

Processes being developed, which provide treatment of the books using non-aqueous solutions of monomeric but polymerisable materials, for example methyl methacrylate, ethyl acrylate or dimethyl aminomethacrylate, take into account this problem of viscosity increase. The polymerization of the monomers is effected by the action of ionizing rays.

By incorporating a polymer into the fibrous structure of the paper, strengthening is indeed possible, but this process requires the use of complex techniques.

An object of the present invention is to provide an improved restrengthening process and product, in which the disadvantages mentioned are avoided and which is particularly suitable for efficient treatment.

SUMMARY OF THE INVENTION

The object of the invention is achieved by treatment of the damaged paper with an isocyanate compound in solution and/or vapour form.

It has been found that isocyanates have excellent suitability for restrengthening damaged paper. One reason for this consists in the reactivity of the isocyanates with the OH groups of the cellulose in the paper.

The isocyanates may be used for the treatment in the form of solution and alternatively or additionally in the form of vapour.

DETAILED DESCRIPTION OF PREFERRED EMBODIMENTS

Good strengthening results are achieved in particular using isocyanates having two or more reactive isocyanate groups by crosslinking the cellulose molecules.

Isocyanates are characterized by the general formula $$R(-N{=}C{=}O)_n$$

where R represents an organic moiety group which may be derived, for example, from methane, propane, hexane or also from groups such as cyclohexane, benzene, toluene, and n is at least one, preferably two.

The isocyanate group —N=C=O has considerable reactivity due to its strongly unsaturated character.

For example the reaction with OH groups can take place according to the equation:

$$R{-}N{=}C{=}O + R'{-}OH \rightarrow R{-}NH{-}CO{-}OR'$$

In industry this reaction is for example employed with diisocyanates and diols for producing the particularly high-grade polyurethane group of plastics.

The OH groups in the cellulose can be regarded as relatively inert and require strongly acting reaction partners for a reaction. Hence, for example concentrated acids are required to esterify these OH groups.

Surprisingly, it has been found that reactions take place which lead to strengthening of paper even at room temperature and using strongly diluted isocyanates.

By using suitable catalysts, for example in the form of organic tin compounds or amines, the reaction time may be shortened further and the strengthening result improved. Tin compounds, such as tin octoate, dibutyl tin dilaurate, amines, also polyamines, aminoethers, N-alkylmorpholines, and octoates and naphthenates of lead, zinc, calcium and magnesium and sodium p-nitrophenol, can be used as catalysts.

Solutions of isocyanates in a suitable solvent have only low viscosity, so that penetration is ensured even of entire book blocks. In addition to siloxanes (preferably disiloxanes, such as hexamethyldisiloxane) and standard solvents (such as for example toluene and petroleum spirit), also ethyl acetate, FCHC 113, methylene chloride or other CHCs are possible as solvents.

Since the isocyanates are not high molecular materials= the latter are only formed in the paper by the reaction with the cellulose molecules=there is no bonding of the pages.

For one paper treatment of the invention, the papers or the books are preferably initially dried to a low moisture content (e.g. about 0.5%) and then impregnated with isocyanate solution. After an exposure period of only about 15 minutes, the papers are taken from the solution. The solvents are removed by means of vacuum drying at 50° C.; only about 10 to 15 minutes were required for this when using microwave radiation. Which type of drying is used and how long the treatment solution is allowed to act is not essential to the invention. The process may be carried out in comparable manner even when using isocyanate vapours.

The strengthening treatment may also be advantageously associated with paper deacidification, by introducing a deacidification agent into the paper in a further process step after strengthening.

The following examples show the effectiveness of the process of the invention and of the strengthening agent used according to the invention.

The strengthening results of the examples were achieved on a paper 70 years old, the process having been carried out as described above. The stability investigation was carried out by kink folding the paper and subsequent measurement of the breaking force using current processes for paper technology.

The results of a paper treated with methyl cellulose solution are also listed for comparison.

EXAMPLE 1

940.0 g of toluene 60.0 g of 2,4-toluylene diisocyanate gave as treatment solution an increase in stability of 23% compared to untreated paper.

EXAMPLE 2

939.4 g of toluene 60.0 g of 2,4-toluylene diisocyanate 0.6 g of tin octoate gave as treatment solution for the same amount of paper an increase in stability of 40% compared to untreated paper.

EXAMPLE 3

940 g of hexamethyldisiloxane 60 g of 1,6-hexane diisocyanate gave as treatment solution an increase in stability of 85% compared to untreated paper.

EXAMPLE 4

939.4 g of hexamethyldisiloxane 60.0 g of 1,6-hexane diisocyanate 0.6 g of tin octoate gave as treatment solution an increase in stability of 96% compared to untreated paper.

COMPARATIVE EXAMPLE 5

990.0 g of 0.1% strength aqueous calcium hydroxide solution 10.0 g of methyl cellulose (Tylose MH5O, Hoechst)

gave as a treatment solution an increase in stability of 38% compared to untreated paper.

In addition to the isocyanates listed, those having for example one or three isocyanate groups are also possible, as are isocyanates in which R in the formula given above is formed by another group, for example the groups stated above.

We claim:

1. A process for restrengthening damaged paper which comprises treating the damaged paper with an isocyanate compound and hexamethyldisiloxane solvent in at least a solution form.

2. The process of claim 1 wherein said damaged paper is treated with an isocyanate compound of formula $R(—N=C=O)_n$ where R is an organic moiety and n is at least 1.

3. The process of claim 1 wherein said damaged paper is treated with the isocyanate compound containing two isocyanate groups per molecule.

4. The process of claim 1 wherein said damaged paper is treated with said isocyanate solution containing a catalyst for reaction between said paper and the isocyanate compound.

5. The process of claim 4 wherein said catalyst comprises an organic tin compound catalyst.

6. The process of claim 1 wherein the isocyanate compound is 1,6-hexane diisocyanate.

7. The process of claim 1 wherein the damaged paper in one of bound and unbound form is dry and is impregnated directly with isocyanate solution, said impregnated paper subsequently being dried to remove said disiloxane solvent.

8. Restrengthened damaged paper as produced by the process of claim 1.

* * * * *